July 26, 1938.  R. D. HENDERSON  2,124,947
STEERING COUPLING FOR TRAILER VEHICLES
Filed Jan. 29, 1937  2 Sheets-Sheet 1

INVENTOR.
Robert D. Henderson
BY
ATTORNEY.

July 26, 1938.  R. D. HENDERSON  2,124,947

STEERING COUPLING FOR TRAILER VEHICLES

Filed Jan. 29, 1937  2 Sheets-Sheet 2

INVENTOR.
Robert D. Henderson
BY
ATTORNEY.

Patented July 26, 1938

2,124,947

UNITED STATES PATENT OFFICE 2,124,947

STEERING COUPLING FOR TRAILER VEHICLES

Robert D. Henderson, New York, N. Y.

Application January 29, 1937, Serial No. 122,909

6 Claims. (Cl. 280—33.5)

This invention relates to improved means for towing a vehicle and more particularly to a steerable wheel suspension on a trailer vehicle and a towing linkage operable by the towing vehicle to steer said wheel.

In prior art practice, a trailer such as the well known automobile trailer, has been provided with a forwardly located third wheel which is placed in a swivel or caster type mounting. There is no direct application of steering force to the wheel, as the direction of the pull on the trailer body causes the wheel to eventually adjust itself in the proper direction. In rounding a curve with this type of trailer, the wheels of the trailer do not track exactly with the wheels of the towing vehicle, but follow a path lying inside the curved path of the tow car. Due to this action, the driver of the tow car is obliged to estimate and allow for clearance of the trailer when rounding a corner and to be watchful for developing side sway when proceeding on a curve at a considerable speed. In addition to the above factors, the maneuverability of the tow car with respect to the trailer has been limited to a relative displacement of not more than 90 degrees. The present invention pertains to a trailer coupling which will cause the wheels of the trailer to track exactly with the wheels of the towing vehicle and which will permit a towing car to be parked substantially parallel alongside the trailer.

An object of this invention is, therefore, to provide an improved steering coupling for trailer vehicles which will be more efficient in performance and safe in its use.

Another object is to provide a trailer coupling which is more flexible and which permits a greater angular displacement between the towing vehicle and the trailer.

Another object is to provide a trailer coupling which will effect a perfect tracking of the wheels of the towing vehicle and the trailer.

Still another object is to provide a trailer coupling which is simple in construction and economical in manufacture.

Figure 1:
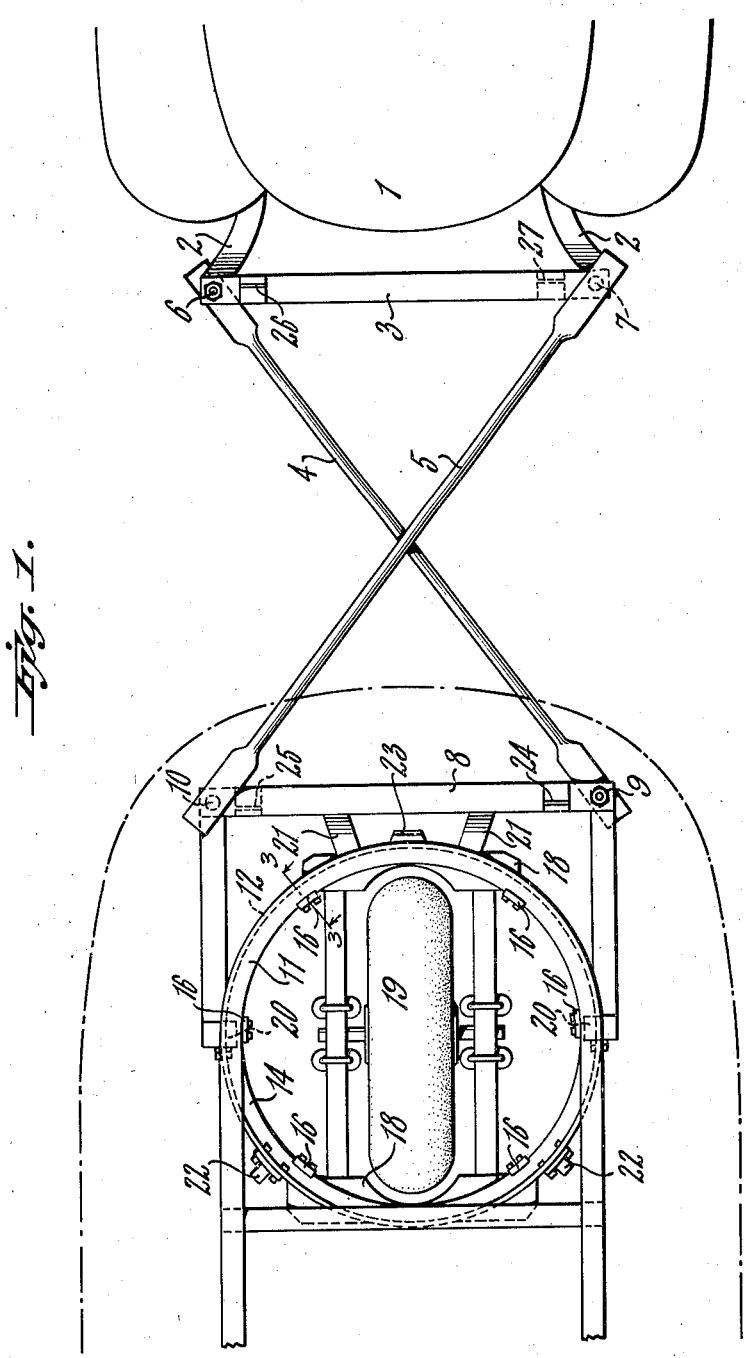
Figure 2:
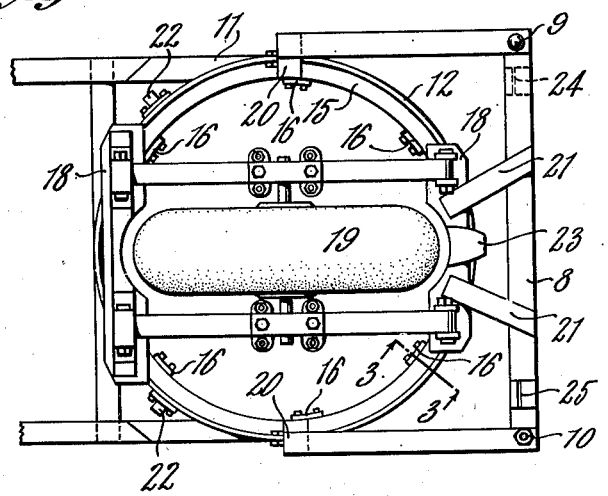
Figure 4:
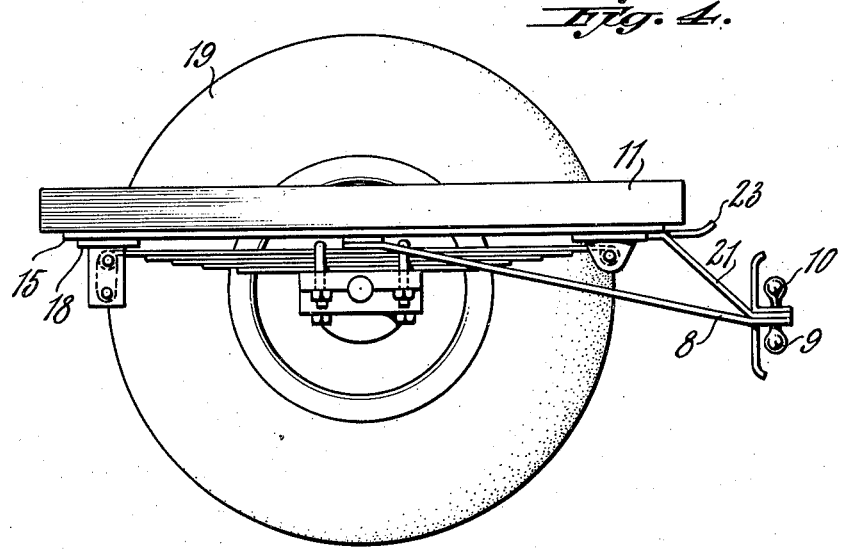
Figure 3:
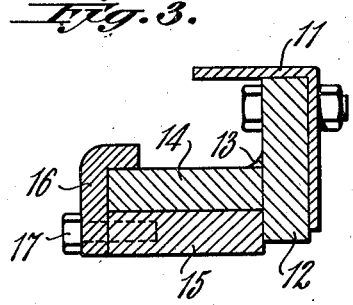

Other objects and advantages will in part be specifically stated and in part be obvious when the following specification is read in connection with the drawings in which:

Fig. 1 is a fragmentary top plan view of the improved coupling and steerable wheel as attached to a towing vehicle; Fig. 2 is a bottom view of the wheel supporting structure and the draft yoke; Fig. 3 is a cross section taken on line 3—3 of Figs. 1 and 2, showing the construction of the fixed and movable springs; and Fig. 4 is a side elevation of the wheel supporting structure, showing the mode of attaching the draft yoke.

Referring in more detail to Fig. 1, the numeral 1 indicates the towing vehicle, which may be an automobile. Attached to the frame of the towing vehicle 1 are brackets 2, which carry a cross member 3. Towing rods 4 and 5 are respectively attached to the ends of the cross member 3 by resilient ball and socket joints of a well known form indicated generally at 6 and 7. The rods 4 and 5 are crossed and are attached to a draft yoke 8 by the respective resilient ball and socket joints 9 and 10. It will be observed that the rod 4 is mounted on the under sides of the cross member 3 and the draft yoke 8, while the rod 5 is mounted on the upper sides. In this manner a sufficient clearance is provided at the intersection of the rods to prevent their contacting due to irregularities of the road surfaces causing the trailer to tip with respect to the towing car.

In its preferred form, the invention herein described relates to a trailer vehicle having a single forward wheel which is adapted to be steered by means of the crossed towing rods above described. The forward end of the trailer frame 11 is semicircular, and has fixedly attached to it a ring 12, best shown in Fig. 3. Secured to the ring 12, as by the weld joint 13, is a horizontally extending ring 14. A movable ring 15 bears against the underside of the ring 14 and is retained thereon by brackets 16 which may be attached to the movable ring 15 by suitable means, as bolts 17. Mounted on the underside of the movable ring 15 are bed plates 18 which carry the spring suspension for the wheel 19, as best seen in Fig. 2. The draft yoke 8 has arms which attach to the movable ring 15 at diametrically opposite points by means of brackets 20, and is also attached to the forward bedplate 18 by the metal straps 21. It may be seen in Fig. 4 that the arms of the yoke 8 and the straps 21 incline downwardly below the trailer frame 11 in order to permit the draft gear to be in any position without hindrance from the trailer frame. The yoke affords bracing sufficient to prevent the movable ring from being deformed under stress and binding against the fixed ring. At the rear of the fixed ring 12 are mounted stops 22 which cooperate with the stop member 23 on the forward bedplate 18 to limit the turning radius of the wheel 19. As shown in Fig. 1, the draft yoke 8 carries an upwardly extending stop 24 which engages the upper tow bar 5, and a downwardly extending stop 25 which engages the lower bar 4. The cross member 3 on the towing vehicle also has a stop 26 for the upper bar 5, and a stop 27 for the lower bar 4. Any suitable padding material, as rubber, may be employed on the contact faces of the various stops.

It will be seen that an extremely flexible coupling is attained by this invention. The wheel 19 may be turned through a total arc of some 270° with the stops 22 placed as shown, and the arc may be extended if desired. As shown, however, the towing vehicle may be maneuvered to parallel the trailer and be headed in an opposite direction. The tow bars 4 and 5 may also be provided with safety cables which assume the load in case of breakage or failure of a coupling joint.

It will be obvious that many changes and modifications may be made by anyone skilled in the art without departing from the spirit and scope of the invention as expressed in the following claims.

I claim:

1. In combination with a towing vehicle and a trailer vehicle, a pair of towing rods crossed intermediate their length and extending between the said vehicles, spaced towing couplings mounted on said towing vehicle, a pivotal connection between each of said rods and a respective coupling, a stop member carried by said towing vehicle and limiting the angular movement of one of said towing rods with respect to said towing vehicle, a dirigible wheel assembly on said trailer, spaced towing couplings carried by said wheel assembly, a pivotal connection between each of said rods and a respective wheel assembly towing coupling, and a stop member mounted on said wheel assembly and limiting the angular movement of the other of said towing rods with respect to said wheel assembly.

2. In combination with a towing vehicle and a trailer vehicle, a pair of towing rods crossed intermediate their length and extending between the said vehicles, spaced towing couplings mounted on said towing vehicle, a pivotal connection between each of said rods and a respective coupling, a stop member positioned adjacent one of said towing couplings and limiting the angular movement of one of said towing rods with respect to said towing vehicle, a dirigible wheel assembly on said trailer, spaced towing couplings carried by said wheel assembly, a pivotal connection between each of said rods and a respective wheel assembly towing coupling, and a stop member mounted adjacent one of said wheel assembly towing couplings and limiting the angular movement of the other of said towing rods with respect to said wheel assembly.

3. In combination with a towing vehicle and a trailer vehicle, a pair of towing rods crossed intermediate their length and extending between the said vehicles, spaced towing couplings mounted on said towing vehicle, a pivotal connection between each of said rods and a respective coupling, a stop member positioned adjacent each of said towing couplings and limiting the angular movement of said towing rods with respect to said towing vehicle, a dirigible wheel assembly on said trailer, spaced towing couplings carried by said wheel assembly, a pivotal connection between each of said rods and a respective wheel assembly towing coupling, and a stop member positioned adjacent each of said wheel assembly towing couplings and limiting the angular movement of said towing rods with respect to said wheel assembly.

4. In combination with a towing vehicle and a trailer vehicle, a pair of towing rods crossed intermediate their length and extending between the said vehicle, spaced towing couplings mounted on said towing vehicle, a pivotal connection between each of said rods and a respective coupling, stop members positioned between said towing couplings, a stop member being adjacent each coupling to limit the angular movement of said towing rods with respect to said towing vehicle, a dirigible wheel assembly on said trailer, spaced towing couplings carried by said wheel assembly, a pivotal connection between each of said rods and a respective wheel assembly towing coupling, and stop members positioned between said wheel assembly couplings, a stop member being adjacent each of said wheel assembly couplings to limit the angular movement of said towing rods with respect to said wheel assembly.

5. In combination with a towing vehicle and a trailer vehicle, a transverse member fixed to said towing vehicle and having a towing coupling positioned at each end thereof, a pair of towing rods each pivotally connected to a respective coupling and crossed intermediate their length, stop members carried by said transverse member and limiting the angular movement of said towing rods with respect to said transverse member, a dirigible wheel assembly on said trailer having a second transverse member mounted thereon, a towing coupling positioned at each end of said second transverse member, a pivotal connection between each of said towing rods and a respective coupling on said second transverse member, and stop members carried by said second transverse member to limit the angular movement of said towing rods with respect to said second transverse member.

6. In combination with a towing vehicle and a trailer vehicle, a transverse member fixed to said towing vehicle, a lower towing coupling on the under surface of said member, a towing rod pivotally secured to said coupling, an upper towing coupling on the upper surface of said member, a second towing rod pivotally secured to said upper coupling and crossing said first rod intermediate its length, a stop projecting vertically from the upper surface of said transverse member at a point remote from said upper coupling, a stop depending from the under surface of said transverse member at a point remote from said lower coupling, a dirigible wheel assembly on said trailer having a second transverse member mounted thereon, a second lower towing coupling on the under surface of said second transverse member, a pivotal connection between said first towing rod and said second lower coupling, a second upper towing coupling on the upper surface of said second transverse member, a pivotal connection between said second towing rod and said second upper coupling, a stop projecting vertically from the upper surface of said second transverse member at a point remote from said second upper coupling, and a stop depending from the lower surface of said second transverse member at a point remote from said second lower coupling.

ROBERT D. HENDERSON.